United States Patent [19]

Jocher et al.

[11] Patent Number: 4,860,173
[45] Date of Patent: Aug. 22, 1989

[54] HEADLAMP FOR A MOTOR VEHICLE

[75] Inventors: Reiner Jocher, Aidlingen; Horst Dahm, Ostelsheim; Fritz Häberle, Sindelfingen, all of Fed. Rep. of Germany

[73] Assignee: Daimler-Benz Aktiengesellschaft, Stuttgart, Fed. Rep. of Germany

[21] Appl. No.: 237,334

[22] Filed: Aug. 29, 1988

[30] Foreign Application Priority Data

Aug. 28, 1987 [DE] Fed. Rep. of Germany ....... 3728752

[51] Int. Cl.⁴ .............................................. B60Q 1/00
[52] U.S. Cl. .................................... 362/61; 362/455; 362/457; 362/267
[58] Field of Search ................... 362/61, 80, 455, 457, 362/267, 269

[56] References Cited

U.S. PATENT DOCUMENTS 4,475,148 10/1984 Tomforde .............................. 362/80
4,669,035 5/1987 Hyde et al. ......................... 362/457

FOREIGN PATENT DOCUMENTS 1430643 8/1964 Fed. Rep. of Germany ...... 362/455
2232905 1/1974 Fed. Rep. of Germany .
8535948 2/1986 Fed. Rep. of Germany .
0151275 5/1980 Netherlands .......................... 362/61
2167548 5/1986 United Kingdom ................. 362/80

Primary Examiner—Ira S. Lazarus
Assistant Examiner—Sue Hagarman
Attorney, Agent, or Firm—Barnes & Thornburg

[57] ABSTRACT

A headlamp for motor vehicles exhibits a diffuser disc which serves to mask a light exit aperture of a reflector housing and which is retained on the latter by a fastening frame and which is braced toward the depth of the reflector housing only by the reflector housing. The reflector housing yields at least in a bracing region in case of a collision and clears the path for a yielding plunging of the diffuser disc into a reflector housing cavity without the fastening frame being prejudicially deformed.

5 Claims, 1 Drawing Sheet

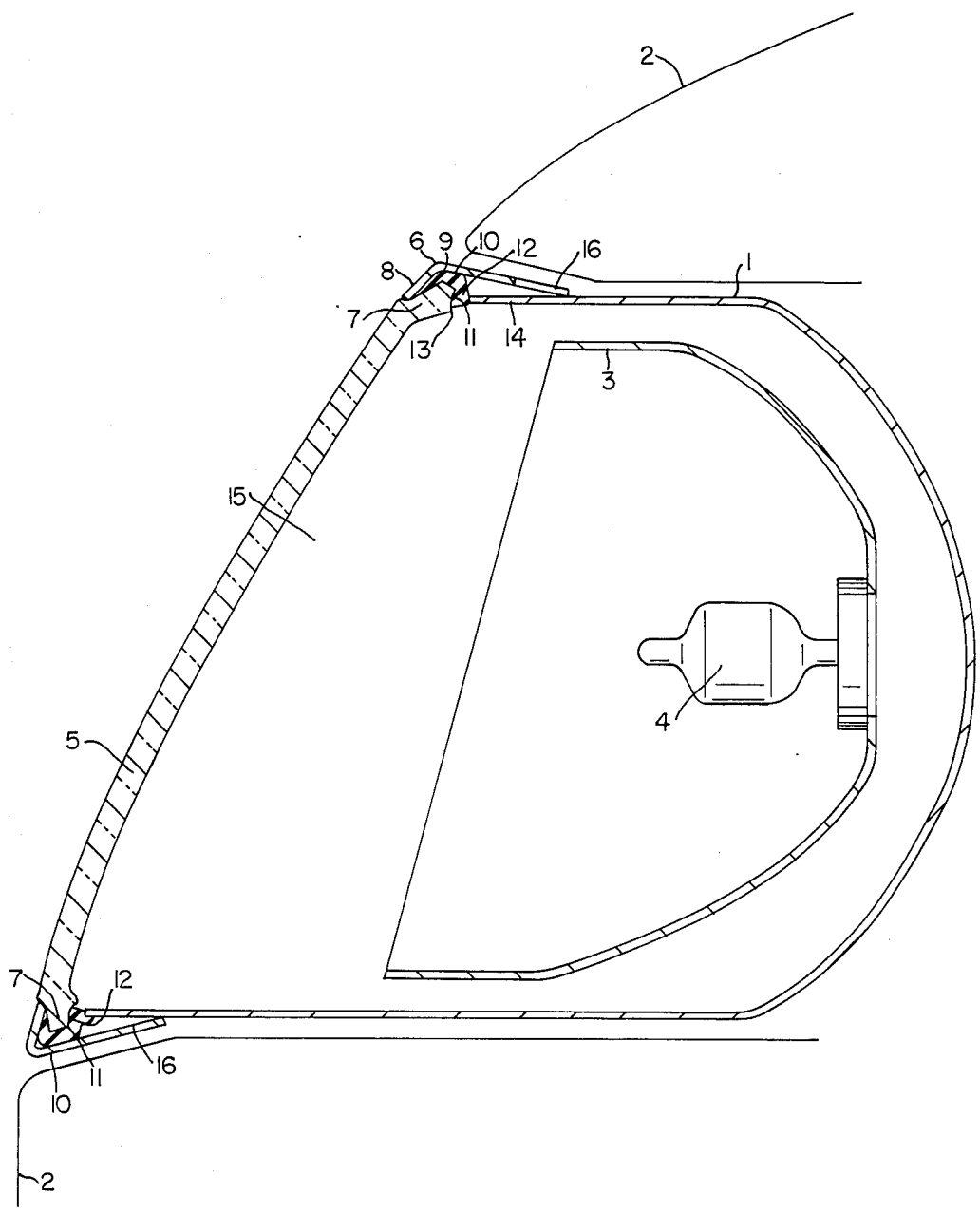

HEADLAMP FOR A MOTOR VEHICLE

BACKGROUND & SUMMARY OF THE INVENTION

The invention relates to a headlamp for motor vehicles of the type having a diffuser disk fitted in an opening of a fastening frame which anchors it to a light reflector housing.

A headlamp for motor vehicles is described in DE-GM 8,535,948, wherein the diffuser disc is firmly connected and/or bonded into a fastening frame housing it all around its edges, and the fastening frame is anchored to the front edge of a reflector.

The fastening frame is required to house the diffuser disc securely so that the latter remains in its position in the case of customary stresses which may occur on the diffuser disc possibly by wind pressure, braking deceleration, or also by supporting a person pushing the vehicle backwards.

In order to ensure this the diffuser disc must be fastened and/or braced in the longitudinal direction of the vehicle on both sides and also along its external circumference. If this fixing in three directions is effected solely by the fastening frame, as described in DE-GM 8,535,948, then it becomes difficult to satisfy a further safety requirement, which is that the hard diffuser disc must be mounted to yield so as to alleviate injury in the case of a collision with a passenger, for example, so that if possible it is not broken, and also that the fastening frame which mounts it undergoes no uncontrollable deformations as a result of which its edges could lead to further injuries Even a diffuser disc bonded into an angled flange of the reflector, such as is known from German Published Unexamined Patent Application (DE-OS) 2,232,905, the support base of which is braced towards the depth of the reflector housing only by the reflector housing, does not satisfy the safety requirements for the construction of a headlamp, because here the diffuser disc finds an unyielding resistance against the reflector housing, which is additionally stabilized by the angled flange in the edge region. This may lead to the possibilities of injury already mentioned.

An underlying object of the invention is to mount a diffuser disc of a headlamp for motor vehicles which is retained by a fastening frame stably for customary stresses and yieldingly in case of a collision without uncontrollable deformation of the fastening frame.

This object is achieved by providing an arrangement wherein the support base is braced towards the depth of the reflector housing only against the reflector housing, wherein at least one upper bracing region of the reflector housing which extends in the direction of the transverse axis of the vehicle yields in case of a violent collision with diffuser disc, its bonded joint with the fastening frame being released and the yielding bracing region then clearing the path for the adjacent support base and therefore for the diffuser disc to plunge into a reflector housing cavity, and wherein the fastening frame encloses and overlaps the front edge of the reflector housing and is fastened to the casing of the reflector housing at least by isolated frame webs.

In preferred embodiments, the diffuser disc is bonded to the rear side of the fastening frame in the longitudinal direction of the vehicle by an all-round support base and likewise along its external circumference.

In preferred embodiments the diffuser disc is braced by the support base towards the depth of the reflector housing only against the reflector housing, but the latter yields at least in an upper bracing region extending in the direction of the transverse axis of the vehicle in the case of a collision or action of violent forces, so that the diffuser disc can be forced into the reflector housing cavity and then does not form a resistance such as to promote injury.

So that the fastening frame does not undergo uncontrollable deformations in that case, after engaging over the front edge of the reflector housing it is fastened in a region which is no longer necessarily involved in the collision with the diffuser disc. The bonded joint may be executed as a permanently plastic bonding seal element, due to which additional sealing against penetration of water or dirt at the transition from the diffuser disc to the fastening frame is no longer necessary, but which also compensates the different coefficients of thermal expansion of the materials to be joined whilst maintaining its fastening and sealing function. Such a construction can also be used favorably as sealing between the diffuser disc and the reflector housing which supports it. To ensure that the bonding seal element is firmly positioned in this case, a channel may be formed along each of the surfaces of the support base according to preferred embodiments of the invention.

In preferred embodiments where the fastening frame is produced from a glass-colored material, then the front aspect of the vehicle creates the advantageous visual impression of a large-area one-piece headlamp.

Other objects, advantages and novel features of the present invention will become apparent from the following detailed description of the invention when considered in conjunction with the accompanying drawings.

BRIEF DESCRIPTION OF THE DRAWINGS

The single drawing figure is a schematic side part sectional view of a vehicle headlamp constructed in accordance with a preferred embodiment of the present invention.

DETAILED DESCRIPTION OF THE DRAWINGS

The drawing shows in longitudinal section a headlamp of a motor vehicle having a reflector housing 1 which is mounted in surrounding body parts 2, and which houses a reflector 3 in which a headlamp bulb 4 is anchored. It is likewise contemplated for a reflector housing 1 itself to be of internally mirrored construction, therefore to form the reflector, and to house a headlamp bulb directly according to non-illustrated embodiments of the invention.

The light exit aperture provided in the reflector housing 1 is masked by a diffuser disc 5, which is fitted into a hole or opening in a fastening frame 6 which engages behind it with an all-round support base 7 shaped integrally on its edges. The support base 7 is retained by a side surface 8 pointing towards the rear side of the fastening frame 6 and along external circumferential surface 9 on the fastening frame 6 by a bonded joint 10, which is produced here by a permanently plastic bonding seal element 11.

This bonding seal element simultaneously causes the transition from the diffuser disc 5 to the fastening frame 6 to be sealed against penetration of water and dirt, and the different coefficients of thermal expansion of the materials to be joined to be compensated without prejudicing the bonded joint.

The permanently plastic bonding seal element 11 is likewise extended along a second side surface 12 of the support base 7, by which it is braced towards the depth of the reflector housing only by the reflector housing 1. In order to obtain good retention of the permanently plastic bonding seal element 11, a channel 13 is shaped into the support base 7 along this second side surface 12. A similar channel can also be advantageously provided along further surfaces 8 and 9 of the support base 7. Due to this arrangement the diffuser disc 5 is adequately anchored in the fastening frame 6 and to the reflector housing 1 for customary stresses resulting from wind pressure, braking deceleration or also a person pushing the vehicle backwards and resting against the diffuser disc.

For safety considerations, the diffuser disc 5 is required to be mounted yieldingly in the event of a violent collision, a collision of the vehicle with a pedestrian, for example, in which case however, the fastening frame 6 must not undergo uncontrollable deformations which could further increase the danger of injury.

In order to achieve this, at least one upper bracing region 14 of the reflector housing 1 extending in the direction of the transverse axis of the vehicle, against which a section of the support base 7 is braced, is made yielding under powerful stress, whilst the bonded joint 10 of the support base 7 with the fastening frame 6 is released, and this section of the support base 7, and with it the diffuser disc 5 tilts by this side into a reflector housing cavity 15.

The fastening frame 6, which is produced here from glass-colored plastic, and which engages all-round over the front edge of the reflector housing 1, and the casing of which is welded by isolated frame webs 16, is then not involved in this plastic collision responsive deformation.

The arrangement of a yielding bracing region should of course be chosen empirically in relation to the commonest collision points with a diffuser disc and it could also be considered all-round in the case of vertically positioned diffuser discs and a correspondingly large cavity of a reflector housing, for example.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Headlamp for motor vehicles, in which a light exit aperture of a reflector is maskable by a diffuser disc which is fitted into an opening in a fastening frame which anchors it to a stationary reflector housing, the diffuser disc engaging with an all-round support base shaped integrally in its edge along the fastening frame behind its opening, and being retained against the rear side of the latter as well as along the external circumference of the support base by a bonded joint, which resists customary stresses, at the fastening frame, wherein the support base is braced towards the depth of the stationary reflector housing only against the stationary reflector housing, wherein at least one upper bracing region of the reflector housing, which extends in the direction of the transverse axis of the vehicle, yields in case of a violent collision with the diffuser disc, such that the support base and its bonded joint is released from the fastening frame and the yielding bracing region to provide a clear path wherein the adjacent support base and therefore the diffuser disc enters into the stationary reflector housing cavity, and wherein the fastening frame encloses and overlaps the front edge of the stationary reflector housing and is fastened to the casing of the stationary reflector housing at least by isolated frame webs.

2. Headlamp according to claim 1, wherein the diffuser disc is retained in the fastening frame by a permanently plastic bonding seal element which is furthermore located between the stationary reflector housing and the opposite surface of the support base.

3. Headlamp according to claim 2, wherein a channel in which the bonding seal element is anchorable is shaped in the support base at least along the surface which points towards the reflector housing.

4. Headlamp according to claim 1, wherein the fastening frame is produced from tinted colored glass material.

5. Headlamp according to claim 3, wherein the fastening frame is produced from tinted colored glass material.

* * * * *